S. R. NEWTON.
TIRE PROTECTIVE COVER.
APPLICATION FILED APR. 1, 1920.
1,370,549.
Patented Mar. 8, 1921.
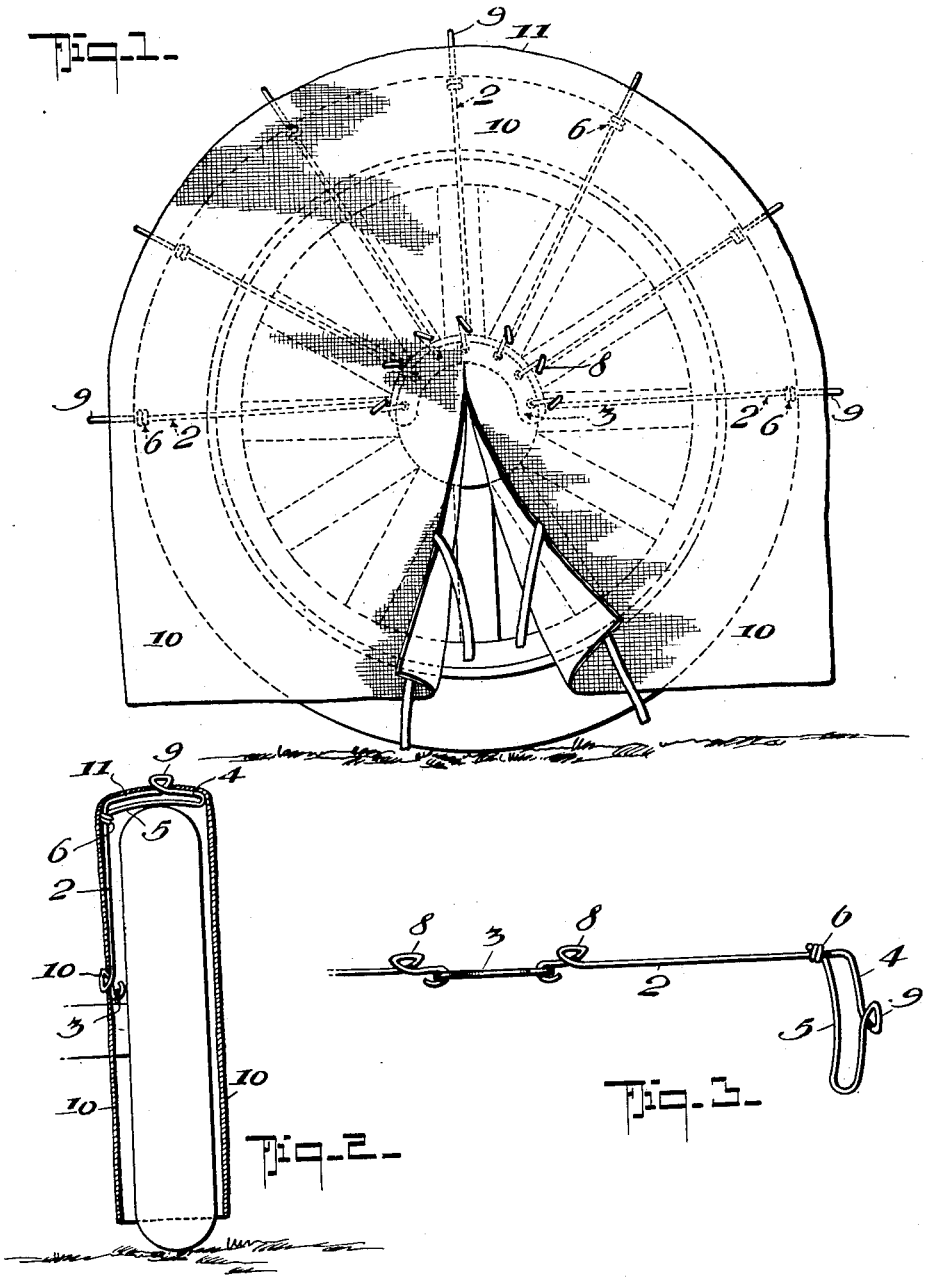
INVENTOR
SYDNEY R. NEWTON
BY
Fred J. Dieterich
ATTORNEYS

UNITED STATES PATENT OFFICE.

SYDNEY R. NEWTON, OF VICTORIA, BRITISH COLUMBIA, CANADA.

TIRE-PROTECTIVE COVER.

1,370,549.

Specification of Letters Patent.  Patented Mar. 8, 1921.

Application filed April 1, 1920. Serial No. 370,424.

*To all whom it may concern:*

Be it known that I, SYDNEY R. NEWTON, citizen of the Dominion of Canada, residing at Victoria, in the Province of British Columbia, Canada, have invented certain new and useful Improvements in Tire-Protective Covers, of which the following is a specification.

This invention relates to a wheel cover designed to protect the tire of a wheel from the heat of the sun.

It is frequently unavoidable that a vehicle having pneumatic or other tires that are injuriously affected by heat has to stand in the sun for a considerable time, and it is desirable for the safety of the tires that they should be sheltered from direct exposure to the sun's heat.

It is to provide a means for protecting the tires of a vehicle when in position on the wheels from this exposure that the invention, which is the subject of this application, has been devised.

The invention is fully described in the following specification, reference being made to the drawings by which it is accompanied, in which:

Figure 1 is a side elevation of a wheel having my cover.

Fig. 2 is an edge view of the same, and

Fig. 3 is a detail of one of the members of the wire supporting frame.

The device comprises a series of bent wire frames 2 radiating from a semi-ring 3 of thin sheet metal adapted to fit over the axle or hub of the wheel.

One end of each of these wire frames 2 is pivotally connected to the outer edge of the ring 3 and extends outward to a short distance beyond the radius of the wheel tire where it is bent across the width of the tire, as at 4, and backward, as at 5, and the end is made fast at 6 to the radial portion of the frame. Adjacent the connection to the semi-ring 3 a lengthwise elongated loop 8 is formed in the wire and a similar loop 9 about the middle of the bent over portion 4. This constitutes the supporting frame of the cover.

The fabric cover comprises two side portions 10 connected together by an edge strip 11. The upper part of each side 10 is semi-circular to fit over the ends 4 of the radial wire frames 2 which are equally spaced apart, the loops 8 and 9 being passed through apertures provided for them in the sides 10 and edge 11 of the cover.

From the lower side of the semi-circle of the cover it hangs down as curtains to a few inches from the ground. This depending portion is medially slit from the center of the semi-circle to the bottom edge, and the edges of the slits are in the front provided with suitable fastenings by which they may be closed together. Apertures may be provided through the fabric in the upper part of the cover to induce a circulation of air between the tire and the cover, if such is found necessary.

The apertures in the fabric of the cover for the loops 8 and 9 are slightly smaller than the length of the loops that the loops may be passed endwise through them and will retain the fabric on the frame unless it is desired to remove it.

To avoid removal of the covers and replacement of the same, if it should be found necessary to move the car for a short distance after the covers have been applied, they may be suspended by the loops 9 from hooks inside the mud guards, or by any other convenient means, instead of having them rest on the tires, as shown and described.

With a cover so constructed the wheel tires are not only shielded from the direct heat of the sun, but an air space is retained between the tire and the cover which affords fuller protection. The arms 2 being radially mounted on the semi-ring 3, the covers may be compactly folded for convenient disposition in the car when not required for use. The fabric covers being removably connected to the radial frames may be taken off when it is desired to wash them.

Having now particularly described my invention, I hereby declare that what I claim as new and desire to be protected in by Letters Patent, is:

1. A tire cover of fabric, the upper part of which conforms generally to the upper half of the wheel and the lower part depends vertically to a short distance above the ground, the sides of the depending portion being vertically slit from the bottom edge to approximately the center of the upper portion, and means for supporting the cover on and from the tire of the wheel to leave an air space between the casing and the tire.

2. A tire cover of fabric conforming generally to the upper part of the wheel and the lower part depending vertically to a short distance above the ground, the sides of the depending portion being vertically slit to the center of the upper portion, the edges of said slits having provision for attaching them together, and cross members between the sides of the upper portion at a short distance from its edge that will support the cover on and from the tire with an interspace between it and the tire.

3. A tire cover of fabric, the upper part of which conforms generally to the upper half of the wheel and the lower part depends vertically to a short distance above the ground, the sides vertically slit from the lower edge to the center of the upper part, and a light radially folding frame supporting the edge of the cover on and from the wheel tire to leave an air space between them.

4. A tire cover, comprising a semi-ring of thin sheet metal apertured at equal distances apart, wires pivoted in the apertures to radially project outward, the outer end of each wire bent at right angles across the width of the tire and doubled back toward the radiating portion to which it is made fast, and a casing of fabric removably secured to the radiating wires of the frame, the upper part of said casing adapted to conform generally to the upper half of the wheel and depend therefrom to a short distance from the ground, each side of said casing vertically slit from the lower edge upward to adjacent the center of the upper portion, means for securing together the edges of the slits, and means for removably connecting the cover to the radial wires.

5. A tire cover, comprising a frame composed of a semi-ring of thin sheet metal apertured around its outer edge at equal distances apart, a wire pivoted in each aperture, the outer end of which is bent outward and backward across the width of the tire, and provided with an elongated loop adjacent the pivotal connection and another approximate the middle of the outwardly bent portion, a fabric casing the upper part of which conforms generally to the form of the wheel and the lower part depends close to the ground each side of the casing being vertically slit from the bottom edge to adjacent the center of the upper portion, the casing being apertured to receive the elongated loops of the frame wires and support them at equal distance apart.

In testimony whereof I affix my signature.

SYDNEY R. NEWTON.